Patented Feb. 5, 1952

2,584,604

UNITED STATES PATENT OFFICE 2,584,604

METHOD OF MAKING STRONG, HARD SILICA-LIME BRICK

Carl Mendius, Riverside, Ill.

No Drawing. Application December 26, 1947, Serial No. 794,093

2 Claims. (Cl. 106—120)

Although the art of manufacturing steam-cured bricks from sand and lime, and from blast furnace slag and lime, is an old one, the strength and hardness highly desirable in bricks have never, to my knowledge, been obtained. Furthermore, under the conventional methods in use, it is necessary to cure the raw bricks almost immediately after they have been pressed into shape; the longer the delay, the poorer will be the quality of the brick, when cured.

The present invention has for its object to improve the art of making steam cured silica-lime bricks to obtain a brick that is harder and has sharper edges and corners than bricks of that general type made by any prior method of which I am aware, and which will not suffer deterioration when there is even very considerable delay in curing the bricks after they are pressed into shape.

The present invention is the result of experiments made to produce a colored brick through the use of iron sulfate; the addition of such sulfate to the brick forming aggregate giving it a color ranging from light yellow to brown, depending on the amount of sulphate used. I discovered that bricks colored in this way differed greatly in structural properties, depending on when and how the sulfate was added to the mix. Sometimes the bricks were ruined or there was little or no improvement over bricks made by the conventional steam-cured process, whereas at other times there was a very great improvement. I discovered that under some conditions, when burnt lime was mixed directly with the silica component, the sulphate prevented slaking of the lime prior to the curing step; so that slaking did not occur until the bricks were being subjected to the action of steam at a high pressure in the autoclave. Under other conditions, gypsum formed in the brick. In the first case, the expansion of the lime, in slaking, destroyed the structure of the bricks; and, in the second case, the bricks were of inferior quality due to the presence of the gypsum which weakens the brick and causes it to deteriorate when exposed to the weather.

Apparently, when the sulfate is added to a mix containing burnt lime, in the presence of moisture, the sulfate crystallizes and forms over the lime particles coatings or films that are impervious to moisture; thereby preventing the absorption by the lime of sufficient moisture to bring about slaking. These films or coatings disappear under the action of the steam in the autoclave and slaking then takes place; the expansion of the lime during such slaking having a destructive effect on the brick. I thus learned that when the basic mixture is made with unslaked or burnt lime, the sulfate must not be introduced into the mixture until slaking of the lime has been effected.

I also found that whenever an objectionable amount of gypsum appeared in a brick, it was due to introducing the sulphate into a wet mixture (as distinguished from one that is semi-dry). In that event, even though the sulfate meets only slaked lime, the conditions are such that gypsum is created.

Consequently, I discovered two thing; namely that not only must it be made certain that the lime in the mix is in a slaked state at the time the sulfate is added, but also that the mix must be what is known as in a dry state; a wet mixture being one that must be poured into molds and be kept there until it has set, while a dry (or semi-dry) mixture is one that can be pressed into brick form and become immediately self supporting.

Under conventional practice, or when gypsum is present in the mix, the pressed rudimentary bricks must be cured promptly or they will be spoiled. When made in accordance with my invention, however, the pressed, rudimentary bricks may be allowed to stand for a long time, even for several days, without deterioration, before being subjected to the curing process. This is a great advantage because the workmen do not need to coordinate things so as to make certain that the bricks are always quickly put into the autoclave. Thus the workmen are relieved of a strain that is always upon them under conventional practice. Colored bricks must be allowed to stand, uncured, until the colors have set. Under my method all the time that is needed for that purpose is permitted, with no sacrifice of quality. The elimination of the need to rush the rudimentary bricks into the autoclave for curing is important for another reason, namely, the pressing of the aggregate into brick form may safely continue up to quitting time, for example, even though the bricks cannot be put into the autoclave until the next morning or after a week end has passed.

There are other sulfates, beside iron sulfate, that may be used, for example, copper sulfate and zinc sulfate; the latter leaving the bricks white or with the natural color of the aggregate when made by conventional methods. These additional sulphates may therefore be regarded as equivalents that may be substituted for iron sulphates.

In carrying out my new method, either slaked or unslaked lime may be used. Because of the desirability of having a rather dry mix, I prefer to use unslaked lime when the main basic component is granulated, water-cooled furnace slag; the burnt lime slakes, taking up the surplus water usually present in such slag.

The amount of sulfate needed to give the brick strength and hardness is very small, ¼%, by weight, of zinc sulfate, for example, being enough. When a light yellow color is desired, about ½% of iron sulfate will give the desired effect, although up to 2% may be required for the darker colors.

The aggregate, that is, the mixture of silicious material (sand, slag, etc.) and lime may be the same as under any conventional method, namely about 96% of silicious material and about 4% of lime. As a typical example, 96 parts of ordinary blast furnace slag, granulated by water cooling, and 4 parts of burnt lime may be mixed and stirred or agitated to secure proper dispersion of the lime throughout the mass. After the lime becomes slaked, the proper amount of sulfate is added. Dry sulfate is preferably dissolved in an equal amount of water so that, after the sulfate has been poured into the aggregate, further stirring distributes it evenly through the latter. After finally crushing or otherwise working the mixture to remove lumps, if necessary, the mixture is pressed into bricks in the usual way; these bricks subsequently being cured, also in the usual way, in an autoclave under a steam pressure of about 125 pounds.

Completed bricks made according to my process are very hard, have sharp corners and are 50% or more stronger than bricks made from the same material, without the use of sulfate, by conventional processes.

I claim:

1. The method of making a lightweight, hard brick, which consists in mixing silicious material in small pieces with about 4% of burnt lime, the silicious material containing sufficient water to slake the lime, agitating the mixture to cause the lime to take up moisture from the silicious material and thereby effect slaking of the lime and further drying of the mixture, then adding from ¼% to 2% of a soluble sulfate of one of the group of metals consisting of iron, zinc and copper, further thoroughly agitating the mixture, pressing the mixture into self-supporting brick form, and finally, curing the brick by subjecting it to the action of steam under pressure.

2. The method of making a lightweight, hard brick, which consists in mixing granulated blast furnace slag with about 4% of burnt lime, the slag containing sufficient water to slake the lime, agitating the mixture to cause the lime to take up moisture from the slag and thereby effect slaking of the lime and further drying the mixture, then adding from ¼% to 2% of a soluble sulfate of iron, further thoroughly agitating the mixture, pressing the mixture into self-supporting brick form and, finally, curing the brick by subjecting it to the action of steam under pressure.

CARL MENDIUS.

REFERENCES CITED

The following references are of record in the file of this patent:

UNITED STATES PATENTS

| Number | Name | Date |
| --- | --- | --- |
| 731,608 | Owen | June 23, 1903 |
| 1,590,132 | Teitsworth | June 22, 1926 |
| 1,604,574 | Holmes | Oct. 26, 1926 |

FOREIGN PATENTS

| Number | Country | Date |
| --- | --- | --- |
| 5,710 | Great Britain | 1902 |